March 14, 1944.  P. E. DAY  2,344,029
SYNCHRONIZING SYSTEM
Filed May 19, 1941  2 Sheets-Sheet 1

PHILLIP E. DAY,
INVENTOR

BY Lyon & Lyon
ATTORNEYS.

March 14, 1944.　　　　P. E. DAY　　　　2,344,029
SYNCHRONIZING SYSTEM
Filed May 19, 1941　　　2 Sheets-Sheet 2
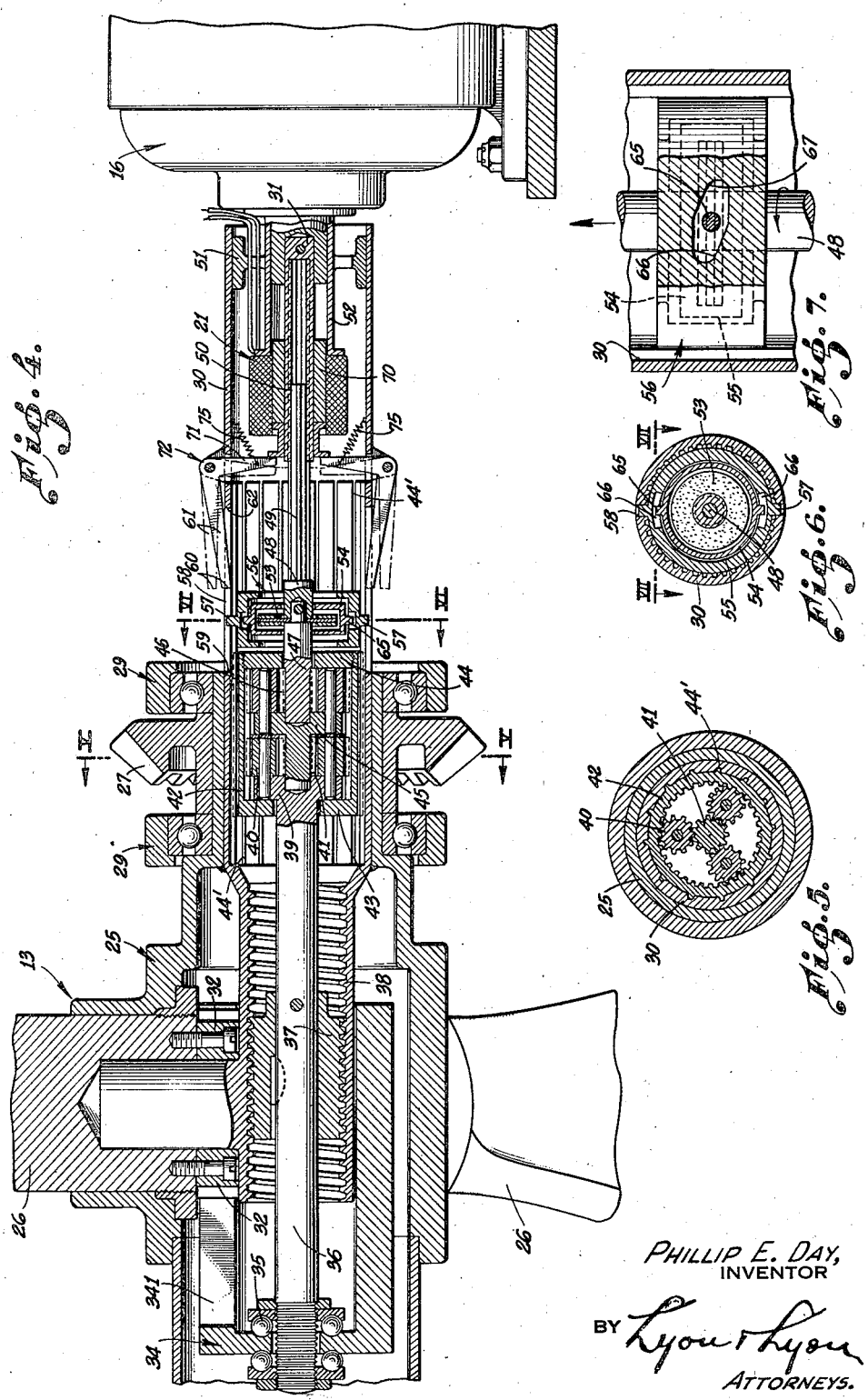
PHILLIP E. DAY,
INVENTOR
BY Lyon & Lyon
ATTORNEYS.

Patented Mar. 14, 1944

2,344,029

UNITED STATES PATENT OFFICE 2,344,029

SYNCHRONIZING SYSTEM

Phillip E. Day, Alhambra, Calif., assignor of one-third to Floyd A. Anthony and one-third to Ballard Day, both of Los Angeles, Calif.

Application May 19, 1941, Serial No. 394,161

6 Claims. (Cl. 170—135.6)

This invention relates to synchronizing systems for maintaining predetermined relative speeds between two moving elements. It is particularly applicable to aircraft employing variable pitch propellers in which the speed of the propeller and the engine connected thereto is controlled by varying the propeller pitch.

An object of the invention is to provide a mechanism of the type referred to which is particularly simple, light in weight, and inexpensive to manufacture.

Another object is to provide a control system for maintaining one moving element in synchronism with another, which is very quick to respond and correct minute departures from the desired speed.

Another object is to provide a synchronizing system for airplanes that functions automatically to vary the pitch of the propellers to maintain them at a predetermined speed, but which can be readily controlled by the operator to shift the propellers into full-feathered position in case of motor stoppage.

Other more specific objects and features of the invention will become apparent from the detailed description, to follow, of a preferred embodiment of the invention.

Heretofore all airplane engine synchronizing systems, of which I am aware have employed a master timing device running at a fixed or controllable speed, with which the speed of the airplane engine is mechanically compared, in combination with a servo mechanism actuated from some separate source of energy for varying the pitch of the propeller in such a direction as to bring the engine back to the desired speed. All such systems have the inherent defect of an objectionable time lag between the first departure from synchronism and the correcting change in the propeller pitch. As a result of this lag, the systems tend to hunt; that is, the engine is continually varying in speed above and below the speed of the master timing device. Such machines are also relatively complicated and, as already stated, require a separate source of energy in addition to the master timing device.

In accordance with the present invention, I utilize directly a difference in speed between the engine and the timing device for producing the mechanical movement necessary to change the pitch of the propeller, deriving the power necessary to do this from the timing device itself, which is usually a synchronous electric motor. By this expedient I effect a substantial simplification of the entire mechanism and also produce a system more delicately responsive to departures from the desired speed, since the slightest departure from normal phase relation between the engine and the timing device results in a compensating change in the pitch of the propeller.

In the drawings:

Fig. 4 is a longitudinal section through one of the propeller units;

Fig. 5 is a cross section in the plane V—V of Fig. 4;

Fig. 6 is a cross section in the plane VI—VI of Fig. 4; and

Fig. 7 is a detail section in the plane VII—VII of Fig. 6.

Figure 1:
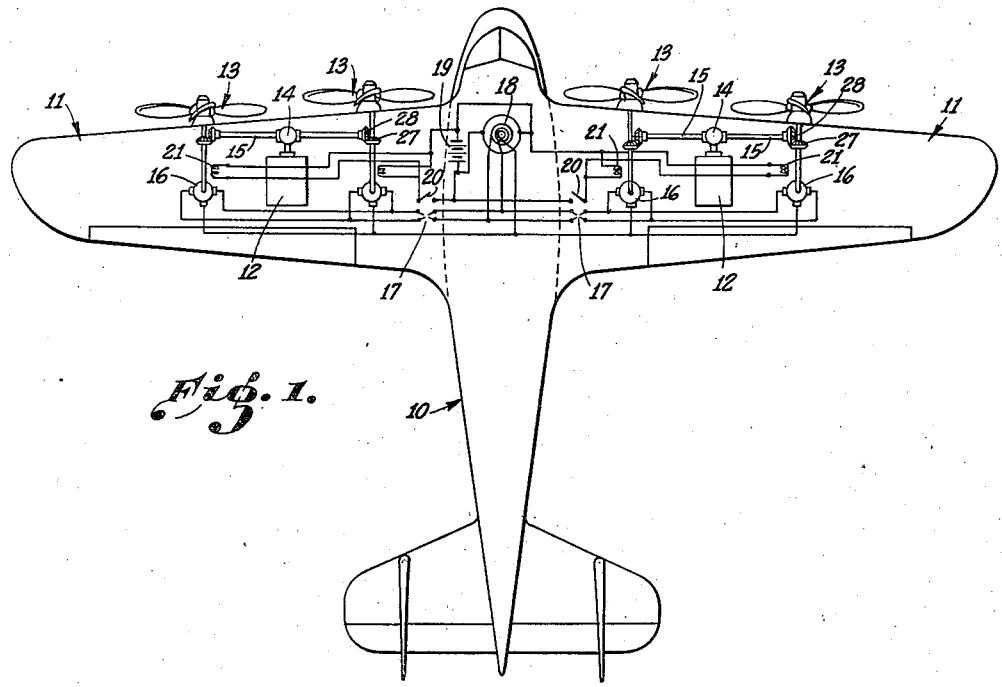
Fig. 1 is a schematic plan of a twin-motor, 4-propeller airplane equipped with a synchronizing system in accordance with my invention.

Referring to Fig. 1, there is shown in plan, a representation of a large airplane having a fuselage 10, wings 11 and two engines 12, one mounted in each wing. Each of the engines 12 drives a pair of propellers 13 through a gear box 14 and a pair of drive shafts 15, which extend laterally from the gear box 14 and are coupled to the propellers 13 by bevel gears.

Each of the propellers 13 is of the variable pitch type, the details of which will be explained later. Associated with each propeller for controlling its pitch and thereby its speed, is a synchronous electric motor 16. The two synchronous motors 16 in each wing are connected through a reversing switch 17 to a source of alternating current 18, which is shown as a synchronous converter energized from a battery 19. The converter 18 and the motors 16 are shown of the three-phase type supplied over three line conductors but the reversing switch 17 involves only two of the conductors since by reversing any two connections on a three-phase self-starting synchronous motor, the direction of rotation can be reversed. There is associated with each of the switches 17 a switch 20, which switches function to connect the battery 19 to solenoids 21, one associated with each of the propellers 13, as will be described later. Each switch 20 is actuated simultaneously with its associated switch 17, and the resultant reversal of the motors 16 and energization of the solenoids 21 functions to shift the propellers into full-feathered (maximum pitch) position, which is the desirable position in case the engine driving the propellers stops.

It is to be understood that although for the purpose of simplifying the drawing and description the source of alternating current has been shown as the synchronous converter 18 energized from the storage battery 19, any available source of alternating current of constant or controllable frequency may be employed, since there is nothing about the system requiring the peculiar characteristics of a rotary converter.

Figure 2:
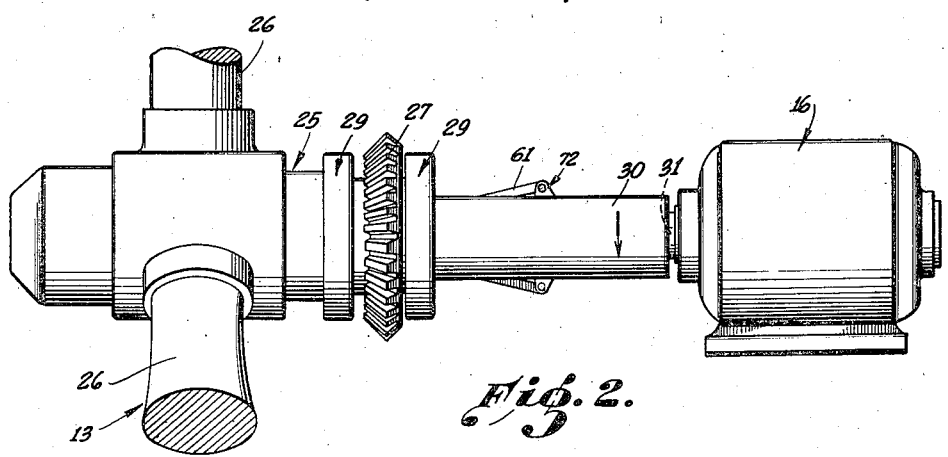
Fig. 2 is a side elevation of one of the propeller units.

Referring now to Fig. 2, each propeller assembly comprises a hollow hub 25 which supports the propeller blades 26 both for revolution about the axis of the hub 25 and for rotation about their individual axes for varying their pitch. The hub 25 is driven by a bevel gear 27 secured thereto which meshes with a bevel gear 28 on the associated drive shaft 15 (Fig. 1). The hub 25 may be rotatably supported by a pair of antifriction bearings 29 positioned on opposite sides of the bevel gear 27.

Secured to the hub 25 for rotation therewith as a unit, is a rearwardly extending barrel 30, and immediately back of the barrel 30 is the synchronizing motor 16, the stator or frame of which is stationarily supported so that the shaft 31 of the motor is coaxial with the barrel 30.

Figure 3:
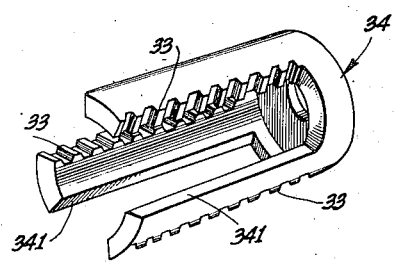
Fig. 3 is a perspective view of a rack element employed in each propeller unit.

Referring now to Fig. 4, each of the propeller blades 26 is rotatably supported in the hub 25 and has secured to its inner end a spur gear 32 which meshes with one of three racks 33 formed on a rack member 34 which is illustrated in perspective in Fig. 3. It will be observed from Fig. 3 that there are three racks 33, one for each blade of the three-blade propeller. It will also be observed that the smooth back 34I of each rack 33 bears against one of the gears 32 to thereby maintain the racks in engagement with the gears.

It will be apparent that by moving the rack member 34 longitudinally in one direction or the other the pitch of all the propeller blades may be simultaneously increased or decreased. An automatic mechanism for shifting the rack member 34 will now be described:

Connected to the forward end of the rack member 34 by an antifriction thrust bearing 35 is a shaft 36 which has pinned to it a screw 37, the latter meshing with an internally threaded sleeve 38 which is rigidly secured at its rear end to the propeller hub 25. Therefore, any rotation of the shaft 36 relative to the hub 25 will shift the shaft forwardly or rearwardly, and the shaft in turn will shift the rack member 34 to vary the pitch of the propeller.

Under normal operation, when the propeller is running at the proper speed, the shaft 36 does not rotate relative to the hub 25. However, the shaft 36 is coupled to the shaft 31 of the synchronizing motor 16 by a mechanism such that any departure from synchronism between the propeller and the motor 16 produces a relative rotation between the shaft 36 and the propeller hub.

This mechanism includes a planetary gear transmission interposed between the shaft 36 and the motor shaft 31. Thus there is secured to the rear end of the shaft 36 a spider 39 carrying three planetary gears 40 (Fig. 5) which mesh with a central sun gear 41 and an outer, internal gear 42. The internal gear 42 is relatively long and has end walls 43 and 44 forming therewith a case for the planetary gears. The outer surface of the internal gear 42 is splined to engage splines 44' in the barrel 30. The entire planetary gear assembly is therefore free to slide longitudinally within the barrel 30 but is restrained against rotation with respect to it.

The sun gear 41 is formed integrally with a spider 45 which in turn supports three planetary gears 46 which mesh with the internal gear 42 and with a sun gear 47, which is secured to a shaft 48 extending through the rear end wall 44. The rear end of shaft 48 is splined, as indicated at 49, and extends into a splined sleeve 50 secured to the motor shaft 31. The spline connection between the shaft 48 and the motor shaft 31 permits the entire assembly including shaft 48, the planetary gear assembly, and the shaft 36, to move forward and backward within the barrel 30 and the hub 25 while maintaining rotary driving connection between the motor shaft 31 and the shaft 48.

The rear end of the barrel 30 is shown supported for rotation on a bearing member 51 which is secured to and projects forwardly from the housing of the motor 16. The solenoid 21, shown schematically in Fig. 1, is shown in Fig. 4 as positioned within the barrel 30 and stationarily supported on a stationary tubular bracket 52 surrounding the sleeve 50 and supported from the motor housing. The function of the solenoid 21 will be described later.

During normal operation, the propeller assembly, including the hub 25 and the barrel 30, rotates at the same speed as the motor shaft 31, so that there is no relative motion between any of the parts within the barrel and hub, and the racks 33 remain in fixed longitudinal position, maintaining the propeller blades at whatever pitch they happen to be set.

As shown in Fig. 1, the two propellers on the right side of the airplane are designed to rotate counterclockwise (looking forwardly) and the two propellers of the left side of the airplane are designed to rotate clockwise. The detailed view of Fig. 4 is of one of the propellers on the left side of the airplane which rotates clockwise. The construction in Fig. 4 is such that forward movement of the shaft 36 and the rack assembly 34 decreases the pitch of the propeller blades whereas rearward movement increases the pitch.

In Fig. 4, if the propeller tends to go faster than the synchronizing motor 16, the mechanism functions to increase the pitch of the propeller (thereby increasing the load on it) to bring it back to proper speed, as follows: The increase in speed of the propeller causes the barrel 30 carrying the ring gear 42, to rotate clockwise relative to the shaft 48. Looked at in another way, the shaft 48 rotates counterclockwise (all directions of rotation are taken looking forwardly of the airplane, or from right to left in Fig. 4) with respect to the gear 42, thereby slowly rotating the planetary gears 46 counterclockwise with respect to the internal gear, at a slower rate, depending upon the relative sizes of the sun gear 47 and the internal gear 42. Since the sun gear 41 is secured to the spider 45, it likewise rotates slowly counterclockwise with respect to the internal gear 42, causing the planetary gears 40 and the spider 39 to rotate at an even slower rate with respect to the internal gear 42. Since the spider 39 is secured to the shaft 36 the latter rotates the screw 37 counterclockwise within the threaded sleeve 38 which retracts the shaft 36 and the rack 34, increasing the pitch of the propeller blades. The action described will continue until the increased pitch of the propeller has increased the load on it sufficiently to bring it back to the same speed as that of motor 16, whereupon all relative motion of the parts within the barrel 30 and the hub 25 again ceases and the propeller pitch is maintained constant. Obviously, if the propeller runs slower than the motor 16, the parts will move in the reverse direction to decrease the pitch of the propeller and thereby reduce the load until the propeller is brought back to the speed of motor 16.

The chief function of the planetary gears within the barrel 30 is to effect a speed reduction between the motor shaft 31 and the shaft 36 to thereby multiply the torque of the motor to a value sufficient to change the pitch of the propeller under all conditions of service without requiring the motor 16 to be of excessive size. It is also advantageous to employ the planetary gear reduction to prevent too sudden and violent changes in the pitch of the propeller in response to variations from the desired speed.

It will be apparent from the foregoing description that a slowing down of any propeller below synchronous speed reduces the pitch of the propeller, which automatically reduces the load on the propeller and under normal circumstances permits it to come back up to synchronous speed. However, if the engine stops, then no variation in the pitch of the propeller will suffice to maintain it at synchronous speed. Furthermore, due to the torque multiplication obtained with the planetary gear assembly, the torque applied to the shaft 36 would, after the propeller had moved into minimum pitch position, apply a severe strain to the parts before finally stalling the electric motor 16. I therefore provide a brake that acts directly on the shaft 48 (Fig. 4) whenever the pitch of the propeller exceeds predetermined limits.

This brake comprises a brake disc 53 secured to the shaft 48 for rotation therewith and having suitable friction facings thereon. This disc 53 is loosely positioned between the annular end walls of a trough-shaped annular member 54 which in turn is slidably supported within a cylindrical surface 55 in an annular trough-shaped member 56, which is slidable longitudinally in the barrel 30 and has a pair of diametrically opposite pins 57 which project into a pair of diametrically opposite slots 58 in the barrel. Longitudinal motion of the member 56 is limited by abutment of the pins 57 either against the forward ends 59 of the slots 58 or against the ends 60 of retractable fingers 61 or against the rear ends 62 of the slots 58. Longitudinal motion of the member 54 within the member 56 is limited by contact of a pair of diametrically opposite pins 65 on the member 54 against cam surfaces 66 and 67 (Figs. 6 and 7), which cam surfaces are constituted by walls or recesses in the member 56 into which the pins 65 project.

Under normal conditions, the longitudinal position of the shaft 48 and the brake disc 53 is such that the members 54 and 56 float freely within the barrel 30 and there is no brake action. However, assume that as a result of engine failure the propeller slows down and the clockwise rotation of the screw 37, with respect to the propeller, moves the shaft 36, the rack member 34 and the shaft 48 forwardly, to reduce the pitch of the propeller. This movement will continue until the disc 53 bearing against the forward end of member 54 carries the latter forwardly, which in turn carries the member 56 forwardly until the pins 57 in the latter bear against the ends 59 of the slot 58, thereby stopping the forward movement of the member 56. The combined forward and rotary movement of the disc 53 carries the pin 65 (Fig. 7) against the cam face 66, blocking further advancing movement of the member 54, whereupon the friction between the forward end wall of the member 54 and the disc 53 stops the disc 53 and stalls the motor 16. This occurs before the propeller blades 26 reach their extreme limit of rotation in the direction of minimum pitch so that the torque as multiplied by the planetary transmission is not applied to the screw 37.

The same action takes place if for any reason increasing the pitch of the propeller does not suffice to bring it down to synchronous speed, except that the braking mechanism moves in the opposite direction (to the right in Fig. 4) until the pins 57 abut against the ends 60 of the fingers 61, whereupon the pins 65 bear against the cam faces 67, and the disc 53 bears against the rear end wall of the member 54 with sufficient friction to force the motor 16 to travel at the higher speed of the propeller.

The purpose of providing the mechanism including the pins 65 and the cam faces 66 and 67 between the member 54 and the member 56 is to insure the release of the brake when reverse torque is developed between the shaft 48 and the barrel 30. Thus if the brake disc 53 on the shaft 48 simply abutted against a disc rigidly secured to the barrel 30, the helical motion of the disc 53 at the time it seated against the disc would wedge the two members together so tightly that the power of the motor 16 would be insufficient to free them. However, with the construction described and shown, particularly in Fig. 7, it will be observed that reverse rotation slides the pin 65 away from the surface 66 or 67 with which it may be engaged, which immediately releases the pressure between the brake disc 53 and the cooperating friction surface on the member 54.

It is general practice at present to limit the range of variable pitch on a propeller from a minimum pitch of 10° to a maximum pitch of 45° during normal flight. Under such conditions the longitudinal positions of the slot ends 59 and the ends 60 of the fingers 61 would be so chosen as to limit the variation of the propeller pitch between a minimum pitch of 10° and a maximum pitch of 45°.

It is highly desirable, however, in case an engine stops, to place the propeller or propellers connected to that engine at maximum pitch, or full-feathered position, in which they offer minimum resistance to forward motion of the airplane and have no tendency to rotate or "windmill." I therefore provide for a manual control enabling the pilot to shift the propellers into full-feathered position in case of engine failure. The controls actuated by the pilot for this purpose include the reversing switches 17 (Fig. 1) and the solenoid control switches 20. Actuation of these switches reverses the direction of rotation of the synchronous motors 16 and energizes the solenoids 21.

Referring now to Fig. 4, reversal of direction of rotation of the motor 16 causes the shaft 36 and the screw 37 to rotate in counterclockwise direction, moving the shaft and the rack 34 rearwardly to increase the pitch of the propellers. At the same time, energization of the solenoid 21 causes it to attract a tubular core member 70, moving the latter forwardly against inwardly extending arms 71 of bellcrank levers 72 having forwardly projecting arms which constitute the fingers 61. Movement of the inwardly projecting arms 71 of the bellcrank levers forwardly into the dotted line position, thrusts the fingers 61 radially outward clear of the pins 57 so that the latter can move rearwardly until they contact the rear ends 62 of the slots 58. The additional travel permitted by moving the fingers 61 clear of the pins 67 permits the propeller blades to be moved into full-feathered position before the motor 16 is stalled by the brake 53, as previously described. The pilot opens the switches 17 and 20 after the propellers have been feathered, to prevent waste of energy and possible overheating of the motor 16 and the solenoids 21.

The fingers 61 are normally maintained in their inner positions by tension springs 75 acting on the arms 71 of the bellcrank levers.

It is to be understood that numerous variations from the exact construction shown can be made without departing from the invention. Thus it is not at all essential that the invention be employed in a system in which one engine drives two propellers, nor is it necessary that the sources of synchronous motion 16 be electric motors, although electric motors are particularly convenient to use for this purpose. Many other variations from the exact constructions described will occur to those skilled in the art, and the invention is to be limited, therefore, only as set forth in the appended claims.

I claim:

1. In a synchronizing system, a controlled rotating member and a controlling rotating member, speed-controlling means mounted on the controlled member and movable to vary its speed, differential means intercoupling said controlled and controlling members and including first and second members directly connected to said controlled and controlling members, respectively, for rotation at the same speeds, and a differential element responsive to differential motion between said first and second members to rotate at a relatively low speed, means positively intercoupling said differential element and said speed-varying means for actuating the latter through a predetermined range of movement in response to continued operation of said controlled and controlling members at different speeds, and braking means between said first and second differential members for directly interlocking said first and second differential members against relative movement in response to movement of said differential element beyond said predetermined range of movement.

2. Apparatus as described in claim 1, in which said braking means includes relatively axially movable braking members, one coupled to said first differential member for rotation therewith and the other coupled to the second differential member for rotation therewith, means for limiting axial movement of one of said braking members by the other braking member, in which the means coupling one of said braking members to its associated differential member includes cam means responsive to reverse movement of said controlled and controlling members following setting of the brakes, for relieving the pressure of said braking members.

3. In combination, a variable pitch propeller having a hollow hub, means supporting said hub for rotation, a synchronizing motor coaxial with said hub and comprising a stationary stator and a rotor, a rotor shaft coupled to said rotor and extending into said hollow hub, a planetary gear assembly slidably supported in said hollow hub for longitudinal movement therewithin and rotation therewith, said planetary gear assembly having an input axial shaft and an output axial shaft and mechanism for rotating the output shaft with respect to said hub only in response to differential rotation between said input shaft and said hub, means coupling said input shaft to said rotor shaft for longitudinal motion relative thereto and rotary motion therewith, screw means intercoupling said output shaft and said hub for longitudinally moving said output shaft and said gear assembly and said input shaft, with respect to the hub, in response to rotation of said output shaft relative to said hub, and means for varying the pitch of said propeller in response to longitudinal movement of said output shaft.

4. In a synchronizing system, a variable pitch propeller member and a controlling rotating member, pitch-controlling means mounted on the propeller member and movable to vary its pitch, differential means intercoupling said members and including first and second elements directly connected to said propeller member and said controlling member, respectively, for rotation at the same speed, and a third differential element responsive to differential motion between said first and second elements to rotate at a relatively low speed, means positively intercoupling said third differential element and said pitch-varying means for actuating the latter through a predetermined range of movement in response to continued operation of said two members at different speeds, and braking means between said first and second differential elements for directly interlocking them against relative movement in response to movement of said other differential element beyond said predetermined range of movement.

5. Apparatus as described in claim 4, in which said braking means includes relatively axially movable braking members, one coupled to said first differential element for rotation therewith, and the other coupled to said second differential element for rotation therewith, means for limiting axial movement of one of said braking members by the other braking member, in which the means coupling one of said braking members to its associated differential element includes cam means responsive to reverse movement of said propeller and controlling members following the setting of the braking means for relieving the pressure between said braking members.

6. In a synchronizing system, a controlled rotating member and a controlling rotating member coaxial with respect to each other, one of said members being hollow and the other extending into the hollow member, differential means positioned within said hollow member and coupling it to the said member therewithin, said differential means including a differential member coaxial with said rotating members and rotatable with respect to said hollow member in response to differential motion between said controlled and controlling members, means movable to vary the speed of said controlled member, and means positively, mechanically coupling said differential member to said speed-varying means whereby the latter is moved in response to departure of the speed of said controlled member from the speed of said controlling member, in which said differential means includes an elongated internal gear secured to said hollow member, first and second longitudinally displaced sun gears within said ring gear, said first sun gear being secured to said other member, a first planetary gear assembly intercoupling said first sun gear with said ring gear and rotatable with respect to said hollow member in response to differential rotation between said rotatable member and said other member, means connecting said first planetary gear assembly to said second sun gear for rotating the latter, a second planetary gear assembly intercoupling said second sun gear to said internal gear, and means directly coupled to said second planetary gear assembly and movable therewith for varying the speed of said controlled member.

PHILLIP E. DAY.